US008570736B2

(12) United States Patent
McClure et al.

(10) Patent No.: US 8,570,736 B2
(45) Date of Patent: *Oct. 29, 2013

(54) COMPONENT ASSEMBLY

(75) Inventors: Stephen Robert McClure, San Francisco, CA (US); Sean S. Corbin, San Jose, CA (US); John P. Ternus, Redwood City, CA (US); Kevin Gibbs, Menlo Park, CA (US); Jeremy C. Franklin, San Francisco, CA (US); Elvis Mwenda Kibiti, San Francisco, CA (US); Jules B. Henry, Palo Alto, CA (US); Benjamin M. Rappoport, San Francisco, CA (US); Erik Andrew Uttermann, Cupertino, CA (US); Alex Chun Lap Yeung, South San Francisco, CA (US); John Raff, Menlo Park, CA (US); Carl Peterson, Santa Clara, CA (US); Brianna C. Wilson, East Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 295 days.

This patent is subject to a terminal disclaimer.

(21) Appl. No.: 13/018,153

(22) Filed: Jan. 31, 2011

(65) Prior Publication Data

US 2012/0194997 A1 Aug. 2, 2012

(51) Int. Cl.
*G06F 1/16* (2006.01)
(52) U.S. Cl.
USPC ....... 361/679.55; 320/135; 429/159; 345/175
(58) Field of Classification Search
USPC ............ 320/101, 126, 107, 103, 135; 29/854, 29/428, 623.1, 592.1; 361/679.55, 679.56, 361/679.41, 679.3, 679.01, 679.06, 679.4, 361/679.07; 429/90, 121, 159, 134, 7, 61, 429/56; 463/30, 22, 16; 345/168, 156, 169, 345/173, 619, 102, 690, 175
See application file for complete search history.

(56) References Cited

U.S. PATENT DOCUMENTS

| 5,419,626 | A | 5/1995 | Crockett |
|---|---|---|---|
| 6,560,092 | B2 | 5/2003 | Itou et al. |
| 6,791,825 | B1 | 9/2004 | Taylor |
| 6,842,333 | B2 | 1/2005 | Lee et al. |
| 7,145,769 | B2 | 12/2006 | Chen |
| 7,232,181 | B2 | 6/2007 | Schmucker |
| 7,331,793 | B2 | 2/2008 | Hernandez et al. |
| 7,633,747 | B2 | 12/2009 | Yang et al. |
| 7,697,281 | B2 | 4/2010 | Dabov et al. |
| 7,821,782 | B2 | 10/2010 | Doherty et al. |
| 7,839,658 | B2 | 11/2010 | Kim |
| 7,921,553 | B2 | 4/2011 | Wojack et al. |
| 7,947,900 | B2 | 5/2011 | Cheng et al. |

(Continued)

FOREIGN PATENT DOCUMENTS

WO 2009/126480 10/2009

*Primary Examiner* — Hung Duong
(74) *Attorney, Agent, or Firm* — Brownstein Hyatt Farber Schreck, LLP

(57) ABSTRACT

A portable computing device is disclosed. The portable computing device can take many forms, such as a laptop computer, a tablet computer, and so on. The portable computing device can include at least a single piece housing with a cavity having a substantially flat bottom wall. A battery assembly and main logic board can be mounted directly to the substantially flat bottom wall with a plurality of additional components arranged around a peripheral edge of the battery assembly and main logic board.

26 Claims, 13 Drawing Sheets

(56) References Cited

U.S. PATENT DOCUMENTS

| | | | |
|---|---|---|---|
| 7,971,464 B2 | 7/2011 | Hachino et al. | |
| D642,563 S | 8/2011 | Akana et al. | |
| 8,081,430 B2 | 12/2011 | Weber et al. | |
| 8,260,377 B2 | 9/2012 | Paleczny et al. | |
| 8,305,741 B2 | 11/2012 | Chatterjee | |
| 8,345,410 B2 | 1/2013 | Ternus et al. | |
| 8,363,399 B2 | 1/2013 | Sonehara et al. | |
| 8,430,256 B2 | 4/2013 | Allore et al. | |
| 2002/0085342 A1 | 7/2002 | Chen et al. | |
| 2007/0081303 A1 | 4/2007 | Lam et al. | |
| 2008/0218955 A1* | 9/2008 | Nishizawa | 361/681 |
| 2009/0040703 A1 | 2/2009 | Gotham et al. | |
| 2009/0197116 A1 | 8/2009 | Cheng et al. | |
| 2009/0257189 A1 | 10/2009 | Wang et al. | |
| 2010/0008514 A1 | 1/2010 | Bates et al. | |
| 2010/0056231 A1 | 3/2010 | Weiss et al. | |
| 2010/0091442 A1 | 4/2010 | Theobald et al. | |
| 2011/0297578 A1 | 12/2011 | Stiehl et al. | |
| 2012/0194393 A1* | 8/2012 | Uttermann et al. | 343/702 |
| 2012/0194998 A1* | 8/2012 | Mcclure et al. | 361/679.56 |

\* cited by examiner

COMPONENT ASSEMBLY

CROSS REFERENCE TO RELATED APPLICATIONS

This patent application is related to and hereby incorporates by reference herein, in their entireties for all purposes, the following co-pending patent applications filed concurrently herewith:

(i) U.S. patent application Ser. No. 13/018239 entitled "FLAT OBJECT EJECTOR ASSEMBLY" by Jules Henry et al.;
(ii) U.S. patent application Ser. No. 13/018174 entitled "HANDHELD PORTABLE DEVICE" by Stephen R. McClure et al.;
(iii) U.S. patent application Ser. No. 13/018184 entitled "ANTENNA, SHIELDING AND GROUNDING" by Erik A. Uttermann et al.;
(iv) U.S. patent application Ser. No. 13/018242 entitled "MACHINING PROCESS AND TOOLS" by Jeremy C. Franklin et al.

BACKGROUND

1. Field of the Described Embodiments

The described embodiments relate generally to portable computing devices such as laptop computers, tablet computers, and the like. More particularly, enclosures of portable computing devices and methods of assembling portable computing devices are described.

2. Description of the Related Art

In recent years, portable computing devices such as laptops, PDAs, media players, cellular phones, etc., have become small, light and powerful. One factor contributing to this reduction in size can be attributed to the manufacturer's ability to fabricate various components of these devices in smaller and smaller sizes while in most cases increasing the power and operating speed of such components. The trend of smaller, lighter and more powerful presents a continuing design challenge in the design of some components of portable computing devices.

One design challenge associated with the portable computing device is the design of the enclosures used to house the various internal components. This design challenge generally arises from a number conflicting design goals that includes the desirability of making the enclosure lighter and thinner, the desirability of making the enclosure stronger and making the enclosure more aesthetically pleasing. The lighter enclosures, which typically use thinner plastic structures and fewer fasteners, tend to be more flexible and therefore they have a greater propensity to buckle and bow when used while the stronger and more rigid enclosures, which typically use thicker plastic structures and more fasteners, tend to be thicker and carry more weight. Unfortunately, however, the increased weight consistent with the more rugged enclosure can lead to user dissatisfaction whereas bowing of enclosures formed of lightweight material can result in damaging some of the internal components (such as printed circuit boards) of the portable device.

Furthermore, the enclosures are mechanical assemblies having multiple parts that are screwed, bolted, riveted, or otherwise fastened together at discrete points. These assembly techniques typically complicate the housing design and create aesthetic difficulties because of undesirable cracks, seams, gaps or breaks at the mating surfaces and fasteners located along the surfaces of the housing. For example, a mating line surrounding the entire enclosure is produced when using an upper and lower casing. Moreover, the various components and complicated processes used to manufacture the portable device can make assembly a time consuming and cumbersome process requiring, for example, a highly trained assembly operator working with special tools.

Another challenge is related to techniques for mounting structures within the portable computing devices. Conventionally, the structures have been laid over one of the casings (upper or lower) and attached to one of the casings with fasteners such as screws, bolts, rivets, etc. That is, the structures are positioned in a sandwich-like manner in layers over the casing and thereafter fastened to the casing. This methodology suffers from the same drawbacks as mentioned above, i.e., assembly is a time consuming and cumbersome process.

In view of the foregoing, there is a need for improved component density and simpler manufacturing techniques that reduce cost and improve outgoing quality. In addition, there is a need for improvements in the manner in which handheld devices are assembled, such as improvements that enable structures to be quickly and easily installed within the enclosure. It is also desirable to minimize the Z stack height of the assembled components in order to reduce the overall thickness of the portable computing device and thereby improve the overall aesthetic look and feel of the product.

SUMMARY OF THE DESCRIBED EMBODIMENTS

A portable computing device is disclosed. The portable computing device can take many forms such as a laptop computer, a tablet computer, and so on. In one embodiment, the portable computing device can include a single piece housing having a front opening. In the described embodiment, the single piece housing can, in turn, include an integral bottom and side walls that cooperate to form a cavity in cooperation with the front opening where an interior surface of the bottom wall is substantially flat and the side walls are curved. In addition to the single piece housing, the portable computing device can include components, including at least a battery cell and main logic board, that are mounted directly to a central portion of the bottom wall. Additional components, including sensors, antennae, buttons, switches, and a speaker module, can be arranged around a peripheral edge of the battery cell and main logic board. The portable computing device can also include a display assembly mounted to the housing and a transparent cover disposed within the front opening and attached to the housing. A bottom portion of the single piece housing and the mounted display assembly can form a protective enclosure for the battery cell.

In another embodiment, a portable computing device is disclosed. The portable computing device can include a single piece housing having a front opening. In the described embodiment, the single piece housing can include an integral bottom and side walls that cooperate to form a cavity in cooperation with the front opening, wherein the bottom wall has an interior surface that is substantially flat. Components, such as battery cells and a main logic board, can be mounted directly to the interior surface of the bottom wall of the housing. The battery cells and a main logic board can be in substantially the same plane and the battery cells can expand into a space between battery cells during operation. A display assembly can be disposed within the front opening and mounted to the housing such that the housing and the display assembly together form a protective enclosure for the battery cell.

In another embodiment, a portable computing device is disclosed. The portable computing device can include a single piece housing having a front opening. The single piece housing can include an integral bottom and side walls that cooperate to form a cavity in cooperation with the front opening. The bottom wall of the housing can have an interior surface that is substantially flat surrounded by a plurality of recesses in a peripheral edge portion. A component can be mounted directly to the substantially flat interior surface of the bottom wall and at least another component can be mounted in a recess in the peripheral edge portion. A display system and transparent cover can be disposed within the front opening and attached to the housing.

In still another embodiment, a method is described. The method can be carried out by receiving a housing having a cavity for receiving internal components, the housing having a cavity with a substantially flat interior bottom surface. Components, including a battery cell and a main logic board, to be mounted to the substantially flat interior bottom surface of the housing is then received. The components are bonded directly to the interior bottom surface of the housing, such that the battery cell and the main logic board are in substantially a same plane.

BRIEF DESCRIPTION OF THE DRAWINGS

The embodiments will be readily understood by the following detailed description in conjunction with the accompanying drawings, wherein like reference numerals designate like structural elements, and in which.

DESCRIBED EMBODIMENTS

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

This paper discusses an aesthetically pleasing portable computing device that is easy to carry with one hand and operate with the other. The portable computing device can be formed of a single piece housing and an aesthetically pleasing protective top layer that can be formed of any of a number of durable and strong yet transparent materials, such as highly polished glass or plastic. For the remainder of this discussion, however, the protective top layer can take the form of highly polished cover glass without any loss in generality. Furthermore, the uniformity of the appearance of the portable computing device can be enhanced since (unlike conventional portable computing devices) the cover glass can be mounted to the single piece housing without the use of a bezel. This simplicity of design can accrue many advantages to the portable computing device besides those related to aesthetic look and feel. For example, fewer components and less time and effort can be required for assembly of the portable computing device, and the absence of seams in the single piece housing can provide good protection against environmental contamination of internal components. Moreover, the ability of the portable computing device to successfully withstand applied loads (such as from day to day use) as well as those from less frequent but potentially more damaging events such as being dropped can be substantially improved over conventional portable computing devices.

In the described embodiments, the single piece housing can be formed from plastic or metal. In the case where the single piece housing is formed of metal, the metal can take the form of a single sheet or block (such as aluminum). The single sheet of metal can be machined or formed into a shape appropriate for housing various internal components as well as providing various openings into which buttons, switches, connectors, displays, and so on can be accommodated. The single piece housing can be machined, forged, molded, or otherwise processed into a desired shape.

These and other embodiments are discussed below with reference to FIGS. 1-18. However, those skilled in the art will readily appreciate that the detailed description given herein with respect to these figures is for explanatory purposes only and should not be construed as limiting.

Figure 1:
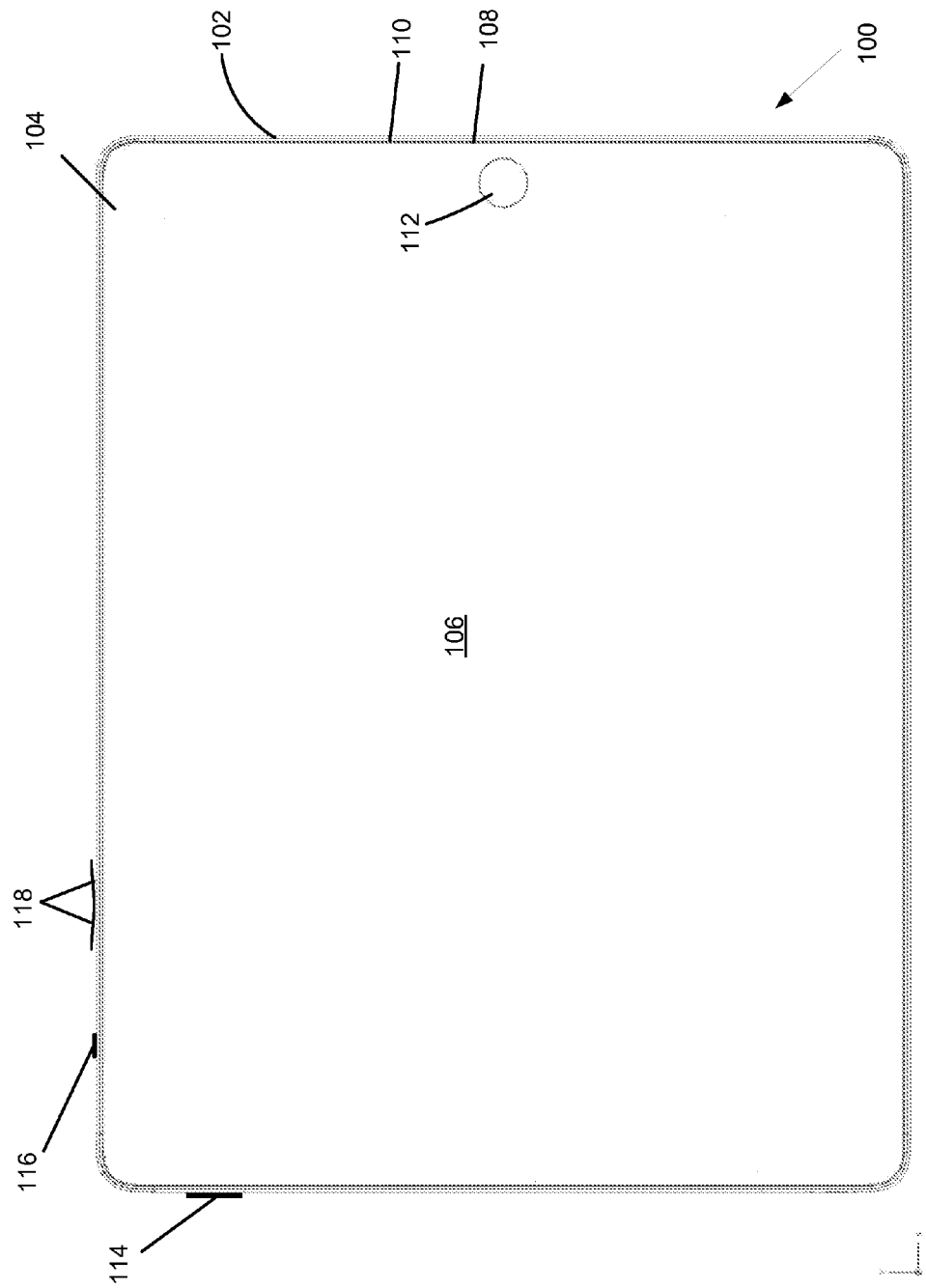
FIG. 1 shows a top view of a portable computing device in accordance with the described embodiments.

FIG. 1 illustrates a specific embodiment of portable computing device 100. More specifically, FIG. 1 shows a full top view of fully assembled portable computing device 100. Portable computing device 100 can process data and more particularly media data such as audio, video, images, etc. By way of example, portable computing device 100 can generally correspond to a device that can perform as a music player, game player, video player, personal digital assistant (PDA), tablet computer, camera, and/or the like. With regard to being handheld, portable computing device 100 can be held in one hand by a user while being operated by the user's other hand (i.e., no reference surface such as a desktop is needed). For example, the user can hold portable computing device 100 in one hand and operate portable computing device 100 with the other hand by, for example, operating a volume switch, a hold switch, or by providing inputs to a touch sensitive surface, such as a display or pad.

Portable computing device 100 can include single piece housing 102 that can be formed of any number of materials, such as plastic or metal, which can be machined, forged, molded, or otherwise processed into a desired shape. In those cases where portable computing device 100 has a metal housing and incorporates RF based functionality, it may be advantageous to provide at least a portion of housing 102 in the form of radio (or RF) transparent materials, such as ceramic or plastic to permit transmission of RF signals therethrough. In any case, housing 102 can be configured to have a cavity for at least partially enclose any suitable number of internal components associated with the portable computing device 100. For example, housing 102 can enclose and support internally various structural and electrical components (including integrated circuit chips and other circuitry) to provide computing operations for portable computing device 100. The integrated circuits can take the form of chips, chip sets, or modules, any of which can be surface mounted to a printed circuit board (PCB) or other support structure. For example, a main logic board (MLB) can have integrated circuits mounted thereon that can include at least a microprocessor, semi-conductor (such as FLASH) memory, various support circuits and so on.

Housing 102 can include opening 104 for placing internal components therein and may be sized to accommodate a display assembly or system suitable for providing a user with at least visual content, such as, for example, via a display. In some embodiments, the display system can include touch sensitive capabilities providing the user with the ability to provide tactile inputs to portable computing device 100 using touch inputs.

The display system 132 can be formed of a number of layers. A separate transparent protective layer 106 formed of polycarbonate or other appropriate plastic or highly polished glass can be positioned over the display system 132. Using highly polished glass, protective layer 106 can take the form of cover glass 106 substantially filling opening 104. Trim bead 108 can be used to form a seal between cover glass 106 and housing 102. Trim bead 108 can be formed of a rigid plastic material. In this way, trim bead 108 can provide protection to the edge of the cover glass 106. The trim bead 108 can be injection molded plastic with a very thin cross-section so it can be very difficult to handle, control, and measure. The trim bead 108 can also be very difficult to mold consistently to the same size, as variations in temperature and humidity at the molding site can cause a big percentage increase or decrease in the size of the trim bead 108. Thus, different bins of housings and trim beads can be sorted and then matched so that the correct housings and trim beads can be matched to minimize the gap between the housing 102 and trim bead 108 to be about 0.05 mm.

In this embodiment, racetrack 110 can be defined as the uppermost portion of the housing 102 that surrounds cover glass layer 106. In order to maintain the desired aesthetic look and feel of portable computing device 100, it is desirable that any offsets between the housing 102 and cover glass 106 be minimized by centering racetrack 110. A display panel 132 (shown in FIGS. 6 and 7) underlying cover glass 106 can be used to display images using any suitable display technology, such as LCD, LED, OLED, electronic or e-inks, and so on.

Portable computing device 100 can include a number of mechanical controls for controlling or otherwise modifying certain functions of portable computing device 100. For example, power switch 114 can be used to manually power on or power off portable computing device 100. Slide switch 116 can be used to mute any audio output provided by portable computing device 100 whereas volume switch 118 can be used to increase/decrease volume of the audio output by portable computing device 100. In the described embodiment, the slide switch 116 can be a sliding switch and the volume switch 118 can be a rocker switch. In other embodiments, slide switch 116 can be provided for other functions. It should be noted that each of the above described input mechanisms are typically disposed through an opening in housing 102 such that they can couple to internal components.

Portable computing device 100 can include a mechanism for wireless communications, as either a transceiver type device or receiver only, such as a radio. Portable computing device 100 can include an antenna that can be disposed internal to a radio transparent portion of housing 102. In some embodiments, an antenna can be incorporated into the trim bead 108 or cover glass 106. In other embodiments, a portion of housing 102 can be replaced with radio transparent material in the form of an antenna window 140 described in more detail below. The radio transparent material can include, for example, plastic, ceramic, and so on. The wireless communications can be based on many different wireless protocols including for example 3G, 2G, Bluetooth, RF, 802.11, FM, AM, and so on. Any number of antennae may be used, which can use a single window or multiple windows depending on the needs of the system. In one embodiment, the system can include at least first and second antenna windows built into the housing.

Figure 2:
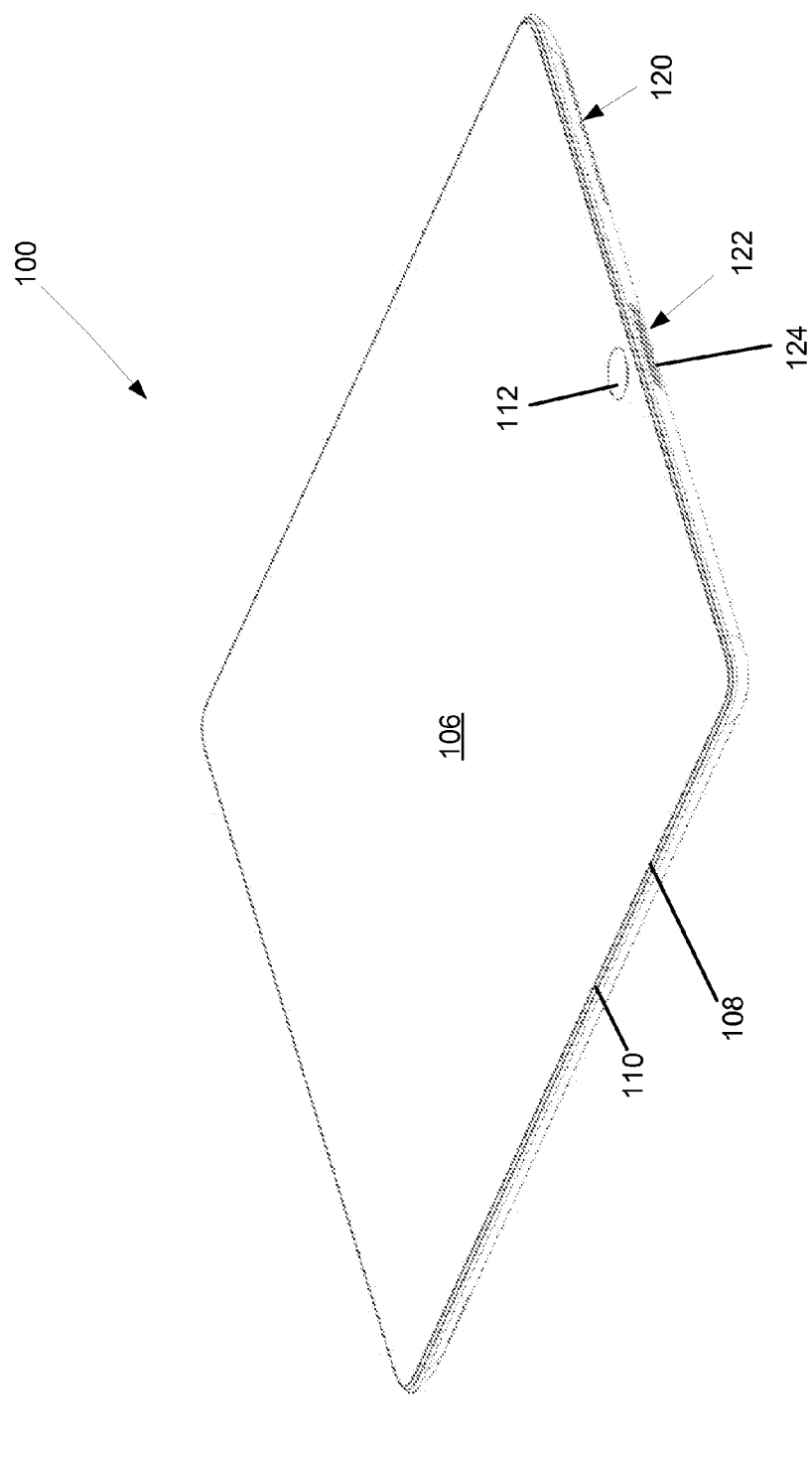
FIG. 2 shows a perspective top view of a portable computing device in accordance with the described embodiments.

FIG. 2 shows a perspective top view of portable computing device 100 in accordance with the described embodiments. As shown in FIG. 2, portable computing device 100 can include one or more speakers 120 used to output audible sound. Portable computing device 100 can also include one or more connectors for transferring data and/or power to and from portable computing device 100. For example, portable computing device 100 can include multiple data ports, one for each configuration of portrait mode and landscape mode. However, the currently described embodiment includes a data port 122 that can be formed of connector assembly 124 accommodated within an opening formed along a first side of housing 102. In this way, portable computing device 100 can use data port 122 to communicate with external devices when portable computing device 100 is mounted in a docking station. It should be noted that in some cases, portable computing device 100 can include an orientation sensor or an accelerometer that can sense the orientation or movement of portable computing device 100. The sensor can then provide an appropriate signal which will then cause portable computing device 100 to present visual content in an appropriate orientation. Such sensors can be coupled to a sensor board 200, which will be described in more detail below.

Connector assembly 124 can be any size deemed appropriate such as, for example, a 30 pin connector. In some cases, the connector assembly 124 can serve as both a data and power port thus obviating the need for a separate power connector. Connector assembly 124 can be widely varied. In one embodiment, connector assembly 124 can take the form of a peripheral bus connector, such as a USB or FIREWIRE connector. These types of connectors include both power and data functionality, thereby allowing both power delivery and data communications to occur between the portable computing device 100 and the host device when the portable computing device 100 is connected to the host device. In some cases, the host device can provide power to the media portable computing device 100 that can be used to operate the portable computing device 100 and/or charge a battery included therein concurrently with the operating.

Figure 3:
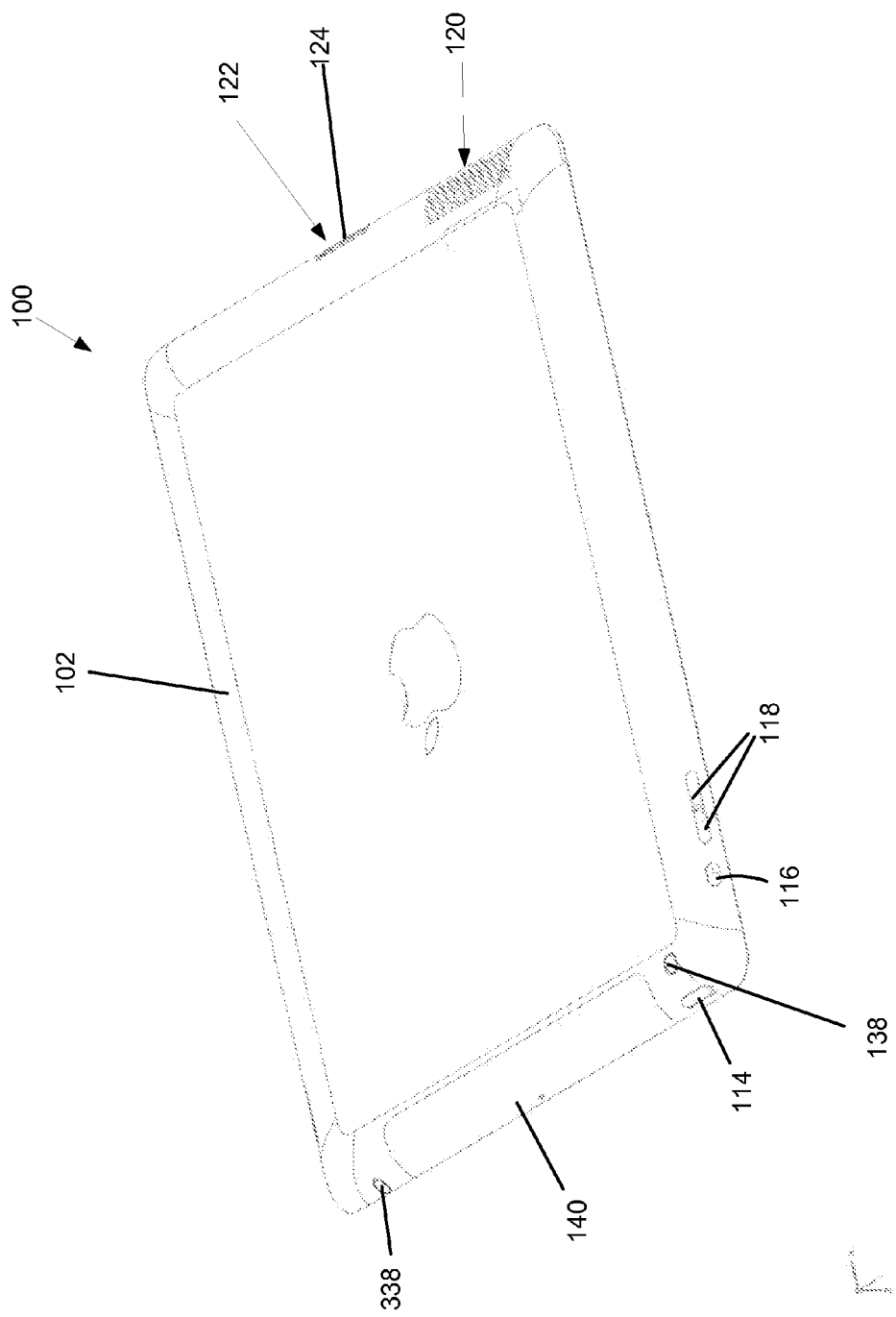
FIG. 3 shows a perspective bottom view of a portable computing device in accordance with the described embodiments.
Figure 4:
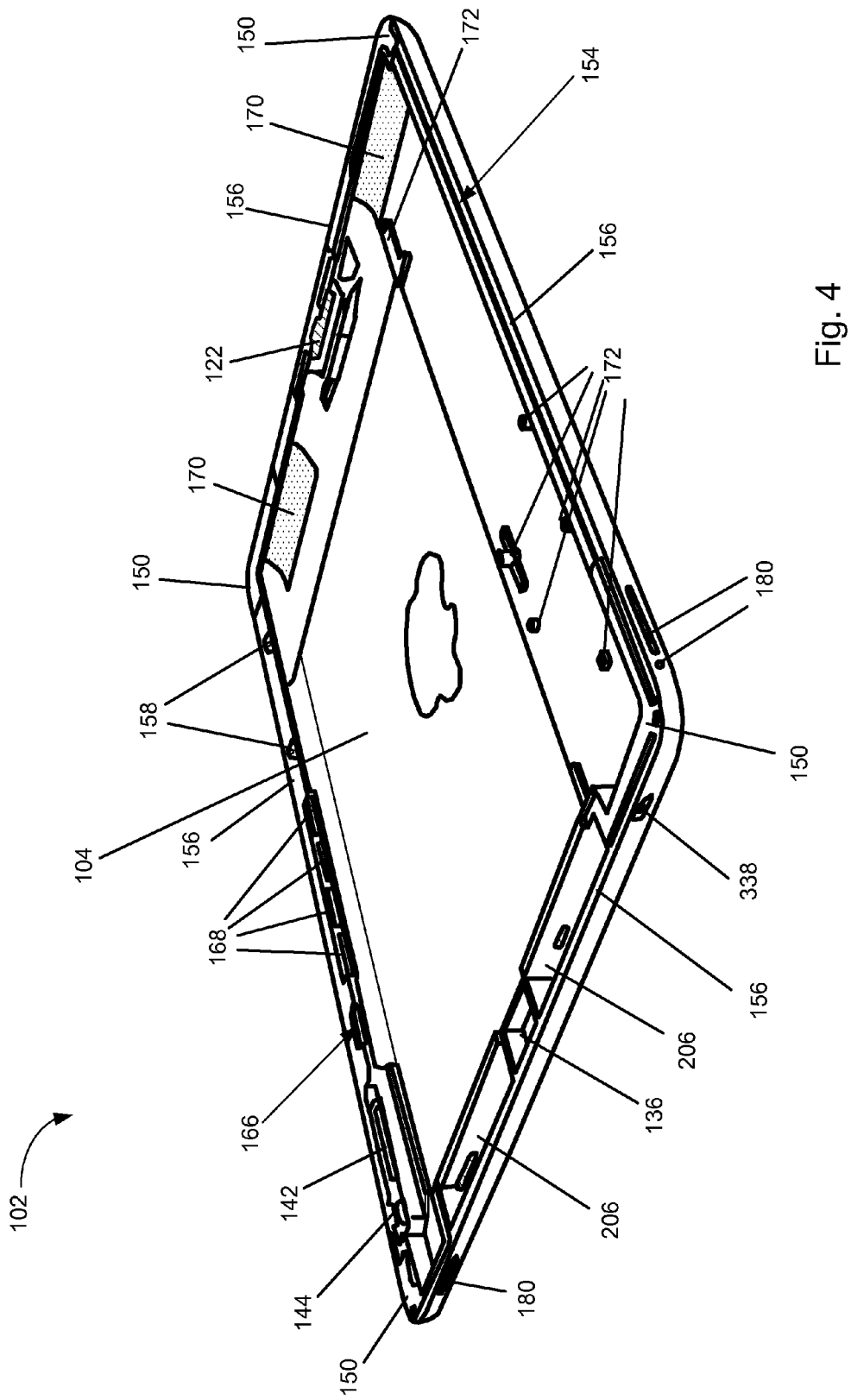
FIG. 4 is a perspective view of view of the interior of the housing of a portable computing device in accordance with the described embodiments.

FIG. 3 shows a perspective bottom view of a portable computing device in accordance with the described embodiments. A perspective interior view of a housing 102 suitable for enclosing operational components of the portable computing device 100 can be seen in FIGS. 4 and 8. As shown in FIG. 4, the housing 102 is formed with an opening 104 into which the internal components are placed. A cavity in the center of the housing 102 provides space for battery cells 304 and the MLB 312. Other components are arranged generally in the periphery around the battery cells 304 and the MLB 312. Some of the components can be positioned in smaller recesses formed in the edge portion or ledge 156 of the housing 102. For example, an RF antenna 204 is positioned in an RF antenna recess 206 and a camera 134 is positioned in a camera recess 136. Magnets 202 that cooperate with a cover can be positioned in slots 168 along an edge of the housing 102. FIG. 4 also shows openings 142, 144 in the housing 102 to accommodate the slide switch 116 and volume switch 118.

A corner bracket 150 can be added to the single piece housing 102 in each corner to strengthen and add stiffness to the housing 102 in those areas. The housing 102 can also be provided with openings or holes 180 for buttons and switches, including a slide switch 116 and volume switch 118. Speaker holes or a speaker grill 170 can also be formed in the housing 102. Speaker attachment features 158 can also be provided on the ledge 156 for attaching the speaker module 320. In the described embodiment, speaker attachment features 158 are provided for attaching a substantially L-shaped speaker module 320. The housing 102 can also be formed with additional features 172 for attaching or aligning components, such as the MLB 312.

The shape of the housing can be asymmetric in that an upper portion of the housing can be formed to have a substantially different shape than that exhibited by a lower portion of the housing. For example, the upper portion of the housing can have surfaces that meet at distinct angles forming well defined boundary whereas the lower portion can be formed to have a substantially flat bottom surface. The transition zone between the upper portion having distinct edges and the lower, substantially flat portion can take the form of an edge having a rounded, spline shape providing both a natural change from the upper portion of the housing (i.e., the area of distinct edges) and the smoother, substantially flat surface presented by the lower portion of the housing. It should also be noted that in addition to providing a more aesthetically pleasing transition, the rounded, spline shape of the edge in the transition zone can provide a more comfortable feel when being held in a user's hand either during use or merely being carried about. One of the advantages to using metal for the housing is ability of metal to provide good electrical grounding for any internal components requiring a good ground plane. For example, performance of a built in RF antenna can be substantially improved when a good ground plane is provided. Moreover, a good ground plane can be used to help mitigate the deleterious effects caused by, for example, of electromagnetic interference (EMI) and/or electrostatic discharge (ESD).

Housing 102 can include a number of features used to facilitate the installation of internal components used in the assembly of portable computing device 100, as shown in FIG. 4. These features are integral with the single body construction of the housing 102, and do not need to be individually mounted to the housing 102. Assembly of the portable computing device 100 is therefore simplified. In the described embodiment, single piece housing 102 can be formed from a single sheet or block of metal (such as aluminum) and formed into an appropriate shape using, for example, core metal forming techniques well known to those skilled in the art.

For example, recess 206 can be formed in housing 102 suitably sized and located for an RF antenna. In the case where recess 206 is used for placing an RF antenna, recess 206 can support an RF antenna support assembly formed of at least some radio transparent material. For example, the RF antenna support assembly may be foam that is pre-loaded into the recess 206 before the RF antenna 204 is placed in the recess 206. The foam RF support assembly can bias the RF antenna 204 against the display assembly 132 so that there is a consistent distance between the RF antenna 204 and the display 132 to improve performance of the RF antenna 204. The RF antenna 204 can be adhered to the display assembly 132 using, for example, PSA. By providing an RF antenna support assembly and an RF antenna window 140 formed of at least some radio transparent material, the RF antenna support assembly and RF antenna window 140 can facilitate unimpeded transmission and reception of RF energy in support of any number of wireless protocols such as WiFi, Blue Tooth, and so on. It should be noted the ability to provide unfettered RF functionality is especially important when housing 102 is formed of radio opaque materials such as most metals.

The following discussion describes specific approaches to both minimizing the Z height of the assembled components and maximizing component density within housing 102. In other words, the Z stack associated with installed internal components is such that the components can be easily accommodated by the cavity in the housing 102 without the need to resort to lengthy and time consuming assembly procedures. The reduced Z stack and improved component density can be accomplished in many ways, such as configuring the structure of an internal component to perform multiple functions.

Figure 6:
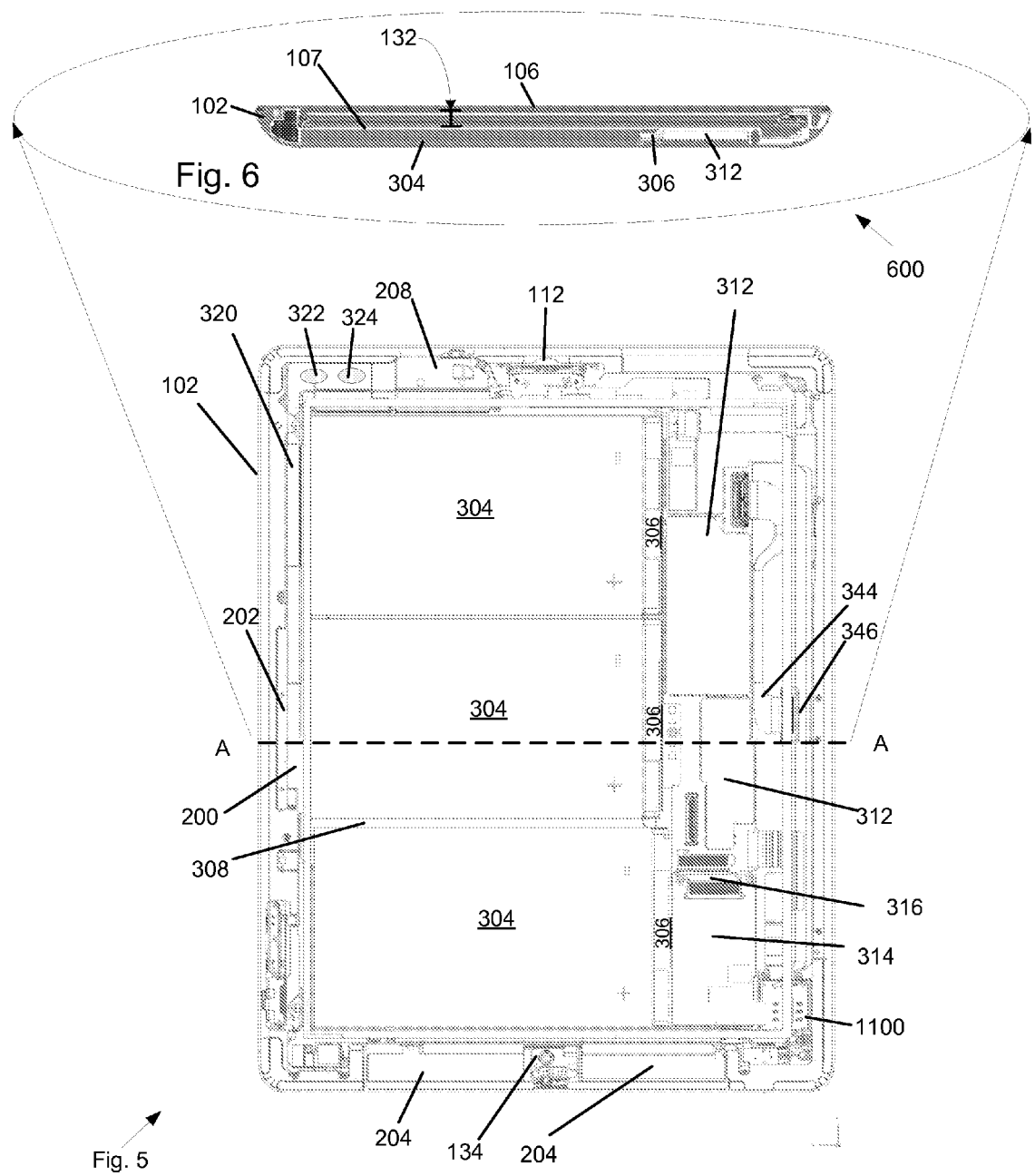
FIG. 6 shows a cross-section along line AA of FIG. 5.

For example, portable computing device 100 can include a battery assembly. The battery assembly can, in turn, include battery cells 304 that can be directly attached to the interior of the bottom wall of the housing 102. In an embodiment, strips of pressure sensitive adhesive (PSA) 105, as shown in FIG. 6, can be used to adhere a battery cell 304 directly to the housing 102 without a conventional battery pack or frame. In the described embodiment, two strips of PSA 105 are used to adhere each battery cell 304. The direct attachment of each battery cell 304 to housing 102 obviates the need for a separate battery support/protection structure, such as a battery case that is typically used in a conventional battery pack. Such battery cases are typically plastic enclosures around the battery cells. The plastic enclosures are separate from the computer or device housing. In the described embodiment, a protective enclosure for the battery cells 304 can be provided by the housing 102 and the display 132 that is directly mounted to the housing 102. By eliminating a separate battery case, the overall weight and z stack height of the power supply assembly can be reduced over that required for a conventional battery pack.

In the described embodiment, all of the battery cells 304 are directly soldered to the same battery management unit (BMU) 306. In other embodiments, the individual battery cells 304 can be electrically connected to each other by way of a flexible connector, or flex. The flexible connector can, in turn, be soldered to the BMU 306. The BMU 306 can be used for some or all of the battery cells in the device.

A gap (referred to as a swell gap) 107 can be provided to accommodate swelling anticipated to occur during normal operation of the battery cells 304. A swell gap 107 can be provided between a bottom wall of housing 102 and a lower surface of the battery cell 304 in the space between the strips of PSA. A swell gap 107 can also be provided in the space above the battery cells 304 between the top surfaces of the battery cells 304 and the bottom surface of the display assembly 132. By providing a swell gap 107 below the battery cells 304, space between the battery cells 304 and the housing 102 that would otherwise be wasted can be used in a productive manner. According to an embodiment, all of the battery cells 304 can be soldered onto the same BMU 306.

Figure 5:
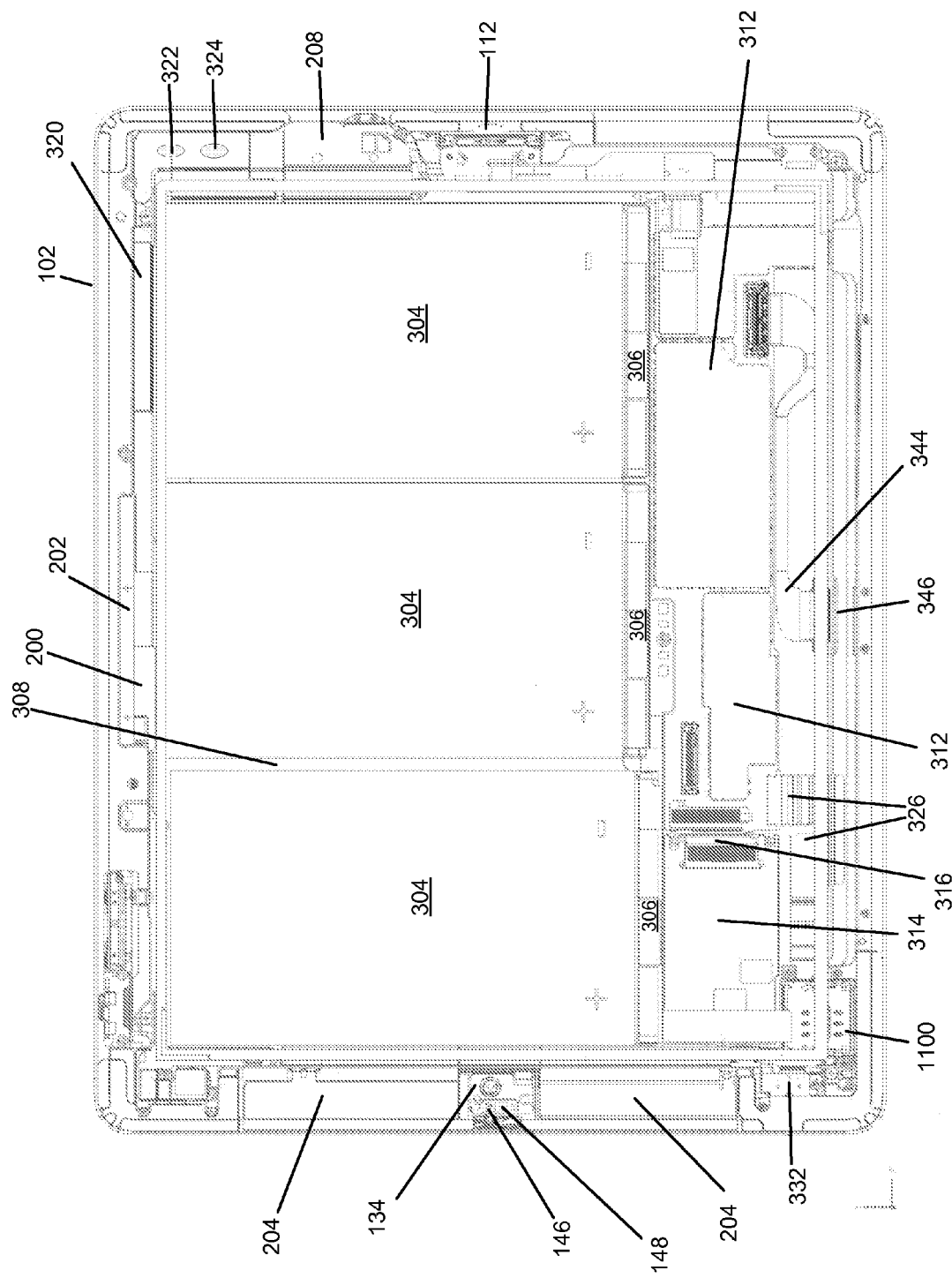
FIG. 5 presents a top level internal view of portable computing device showing a specific arrangement of various internal components in accordance with described embodiments

As shown in FIG. 5, there are generally no structures between the battery cells 304, which are held in their desired positions on the housing 102 by adhesive. To utilize the space between the battery cells 304, a connector cable 308 may be positioned between two cells, as shown in FIG. 5. In the illustrated embodiment, this particular connector cable 308 connects the MLB 312 and the sensor board 200, which can be coupled to sensors. The sensors can be designed to sense things that lead to intelligent decisions by the portable computing device 100. In essence, the sensors can provide information or cues that help predict the portable computing device's future use or user's needs so that the device 100 can be configured accordingly. In most cases, the sensors are configured to sense one or more environmental attributes surrounding the portable computing device 100. Such environmental attributes may, for example, include temperature, ambient light, motion, vibration, pressure, touch, pressure, noise, orientation, time, force, and/or the like.

Thus, the sensors can include antenna proximity sensors, a compass, an accelerometer, a gyroscope, and a Hall Effect sensor mounted on the sensor board 200. The sensor board 200 can extend from the area of the magnets 202 all the way along the peripheral edge of the battery cells 304 to the corner of the device 100 near one of the RF antennae 204, as shown in FIG. 5. It should be noted that the compass should be positioned on the sensor board 200 as far away from the magnets 202 as possible to prevent interference. The sensor board 200 can also be connected to the camera 134, the ambient light sensor (ALS) 146 and the thermal sensor 148 as well as the slide switch 116 and volume switch 118. The connector cable 308 provides a way to connect all of the components coupled with the sensor board 200 with the MLB 312. By positioning the cable connector 308 in the space between two battery cells 304, which would have been otherwise unused, minimizes the overall footprint of the components in the cavity and at the same time keeps the Z stack height minimized by using space in a more efficient manner. Furthermore, it is important for the accelerometer and gyroscope to be as far away from the MLB 312 and its power traces as possible to minimize cross talk, so the connector cable 308 positioned between battery cells 304 is an efficient and clean way to connect the accelerometer and gyroscope to the MLB 312 while keeping them as far away as possible. The sensor board 200 can be rigidly bonded to the housing 102 using PSA with a foam layer on its top surface to bias the sensor board 200 down to the housing 102.

Component density can also be increased. For example, circuits that would otherwise be considered separate can be combined to share a single connector. For example, as discussed above, all of the components coupled to the sensor board 200 can be coupled to the MLB 312 by a single connect, which, in this case, is connector cable 312. Furthermore, an audio module can include both a microphone and associated circuitry that can share a flex connector with an audio circuit used to produce audio output. In this way, both the number and overall footprint of the internal components can be substantially reduced without adversely affecting overall functionality. In this way, the overall component density can be enhanced while at the same time reducing the number of interconnects used.

FIGS. 5-14 illustrate the operational components of portable computing device 100. The operational components are organized substantially in a single layer to minimize the Z stack height of the portable computing device 100. Thus, most of the internal components of the portable computing device 100 are substantially in a single plane. As described in more detail below, most of the components can be mounted directly to the housing 102. In this way, minimizing the Z stack height, portable computing device 100 can have a thin profile and be extremely compact, sturdy, aesthetically pleasing and ergonomic at relatively low cost.

FIG. 5 presents a top internal view of portable computing device 100 showing a specific arrangement of various internal components. In the illustrated embodiment, the internal components can include at least a battery assembly that can include three individual battery cells 304. Individual battery cells 304 can be attached directly to the housing 102 using adhesive, such as PSA strips. Other types of adhesives or mounting methods may also be used to attach the battery cells 304 to the housing 102.

The internal components can also include main logic board (MLB) 312 that can include a number of operational circuits, such as a processor, graphics circuits, (optional) RF circuitry, semiconductor memory, such as FLASH, and so on. MLB 312 can receive power from the battery cells 304 by way of electrical connectors. As shown in FIG. 4, the battery cells 304 and the MLB 312 are positioned in the center of the cavity in the housing 102 with most of the other internal components positioned in substantially the same plane around the periphery of the cavity. As described in more detail below, space is conserved by using thin connectors, such as flex connectors, and by fitting connectors in spaces that would be otherwise unused. In this way, the overall footprint of the internal components as well as the Z stack height can be minimized. Arranging some components in the periphery also serves to isolate certain components from others to improve performance of those components by preventing, for example, cross-talk.

Figure 9:
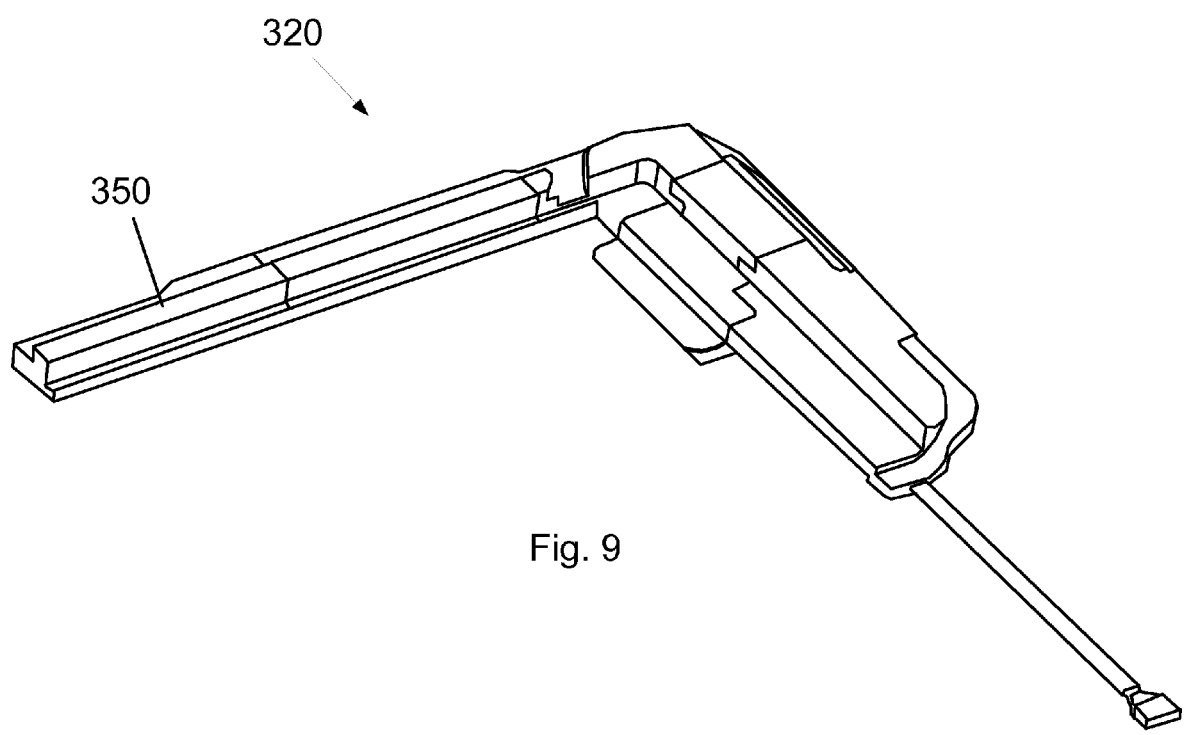
FIG. 9 shows a more detailed view of the speaker module in accordance with described embodiments.

The internal components can also include speaker module 320 that can include audio circuits arranged to provide an audio signal to audio drivers 322 and 324, which can be positioned under the speaker grill 120. Audio drivers 322 and 324, in turn, can provide audible output to speaker 120. FIG. 9 shows a more detailed view of the speaker module 320 of the illustrated embodiment. It will be understood that the audio drivers 322 and 324 are not visible in the view shown in FIG. 9. Shock absorbing foam 350 can be placed on the top and bottom of the speaker module 320 on the end positioned closest to the sensors on the sensor board 200 to protect the sensors, especially the gyroscope, by dampening the vibrations from the speaker module 320. The foam 350 on the bottom of the speaker module 320 can also be used to create the acoustic seal to the housing 102 so all the sound from the speaker module 320 is directed out of the portable computing device 100 and not into it.

Portable computing device 100 can also include a number of antennae used for both transmission and reception of RF energy. For example, at least one RF antenna 204 can be incorporated into recess 206 in the housing 102. In the illustrated embodiment, there are two RF antennae 204, one positioned in each recess 206. A radio-transparent window 140 may be provided in the housing 102 in the area of the RF antennae 204 for better overall reception/transmission. Another antenna 208 for supporting the wireless WiFi protocol can be provided near the peripheral edge of the housing for better antenna performance. A connector cable 210 can couple the WiFi antenna 208 to the MLB 312.

In some embodiments, portable computing device 100 can support a number of different wireless standards. For example, in those cases where portable computing device 100 supports a particular wireless standard (such as the 3G standard), portable computing device 100 can include wireless circuitry appropriate for the particular wireless standard. For example, if portable computing device 100 is 3G compliant, the MLB 312 can include 3G wireless circuitry coupled to an appropriately placed and sized RF antenna 204. Alternatively, in the illustrated embodiment, the RF antennae can be coupled to a radio board 314. In the illustrated embodiment, the radio board 314 is coupled to the MLB 312 via a flex connector 316, as shown in FIG. 5. It should be noted, as discussed above, that a portion of housing 102 is typically replaced with a radio transparent window 140 in cooperation with the RF antenna 204.

In the illustrated embodiment, display bus 344 can connect display driver circuitry to MLB 312 by way of display connector 346, as shown in FIG. 5. In the described embodiment, display bus 344 can take the form of a low voltage differential signaling (LVDS) bus. In the illustrated embodiment, display bus 344 can be figured to connect the display driver circuitry with the MLB 312 while maintaining a thin-profile because the display bus 344 is configured to be flat despite the number of wires required in such a LVDS bus. In an embodiment, the display bus 344 contains 30 wires that can be bundled in certain portions and then fanned out to a single layer or two layers in other portions.

Figure 7:
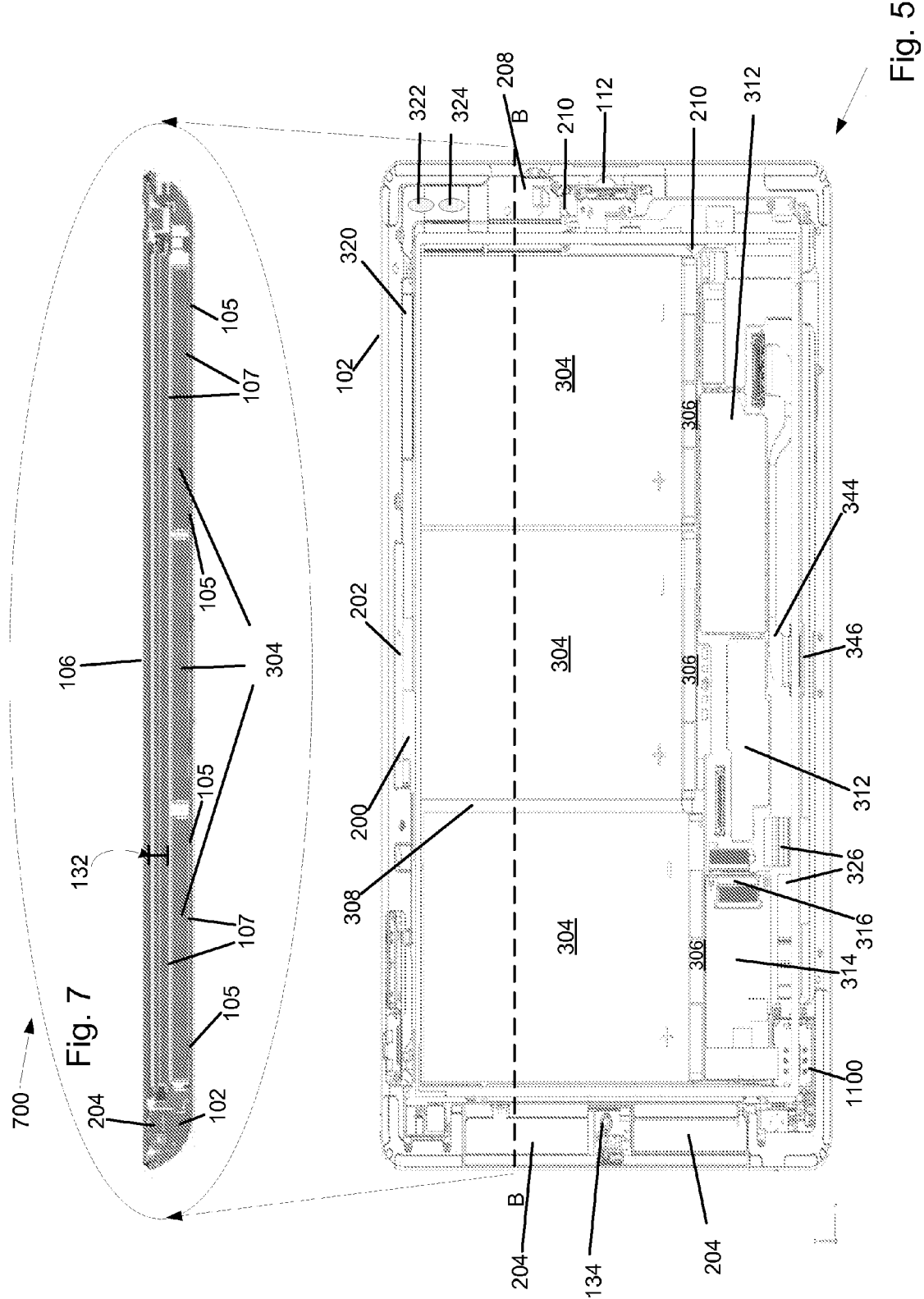
FIG. 7 shows a cross-section along line BB of FIG. 5
Figure 8:
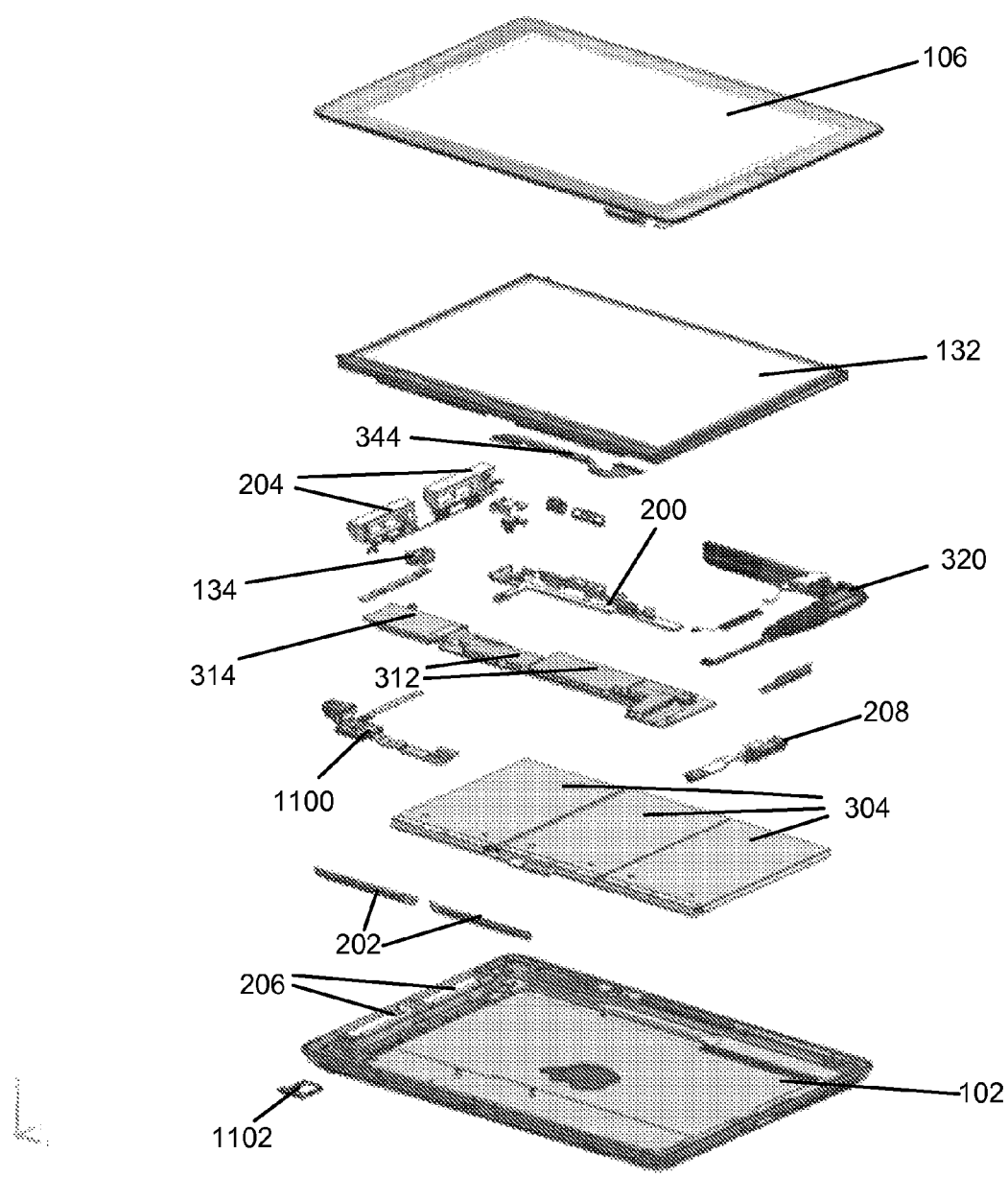
FIG. 8 shows an exploded perspective view of major components of a portable computing device in accordance with described embodiments.

FIG. 6 shows cross-section 600 along line AA of FIG. 5 bisecting battery cells 304 and MLB 312. FIG. 7 shows cross-section 700 along line BB of FIG. 5 bisecting battery cells 304. In particular, cross-sections 600 and 700 illustrate the compact nature and reduced z stack height of the assembled internal components. As shown in FIGS. 6 and 7, the components, including the battery cells 304 and the MLB 312, under the display 132 are substantially in the same plane. As illustrated, these components are mounted to the substantially flat bottom surface of the housing 102. In order to avoid unnecessary interference with RF transmissions from the RF antenna 204, the antenna window 140 can be formed of radio transparent material, such as plastic, glass, ceramic and so on. Display module circuit 506 can be connected to LVDS bus 344 by way of connector 346 and be used to drive display panel 132. FIG. 8 shows an exploded perspective view of major internal components of portable computing device 100. FIG. 8 also shows a perspective interior view of a housing 102 suitable for enclosing operational components of the portable computing device 100 described herein.

Display assembly 132 may be placed and secured within the cavity using a variety of mechanisms. In one embodiment, the display system 132 can have alignment holes that can be lined up with alignment holes on the housing 102 to accurately align the display 132. A temporary fixture can used to align the alignment holes in the display 132 with the alignment holes in the ledge 156 of the housing 102 so that the display is well-centered. While the temporary fixture is in place, an operator is able to screw the display 132 to the housing 102. The display may be placed flush with the adjacent portion of the housing 102. In this way, the display can present visual content that can include video, still images, as well as icons such as graphical user interface (GUI) that can provide information the user (e.g., text, objects, graphics) as well as receive user provided inputs. In some cases, displayed icons can be moved by a user to a more convenient location on the display. For example, GUI can be moved by the user manually dragging GUI from one location to a more convenient location. The display can also provide a user with tactile feedback provided by a number of haptic actuators usually, but not always, arranged in an array of haptic actuators incorporated into the display. In this way, the haptic actuators can provide the user with tactile feedback.

In some embodiments, a display mask (not shown) can be applied to, or incorporated within or under cover glass 106. The display mask can be used to accent an unmasked portion of the display used to present visual content. The display mask can be used to make less obvious home button 112 used to provide a specific input such as change display mode, for example to portable computing device 100. The display mask can render home button 112 less obvious by, for example, being closer in tone or color to home button 112. For example, if home button 112 is formed of a material that is somewhat darker (such as gray or black) than cover glass 106, then using a similarly colored display mask can reduce the visual impact of home button 112 when compared with the unmasked portion of cover glass 106. In this way, the visual impact of home button 112 can be reduced by being integrated into the overall look of the display mask. Furthermore, the display mask can provide a natural mechanism for directing the attention of a viewer to the unmasked area of the display used to present visual content. PSA can also be applied to the backside of cover glass 106 in the area of the display mask to provide support and also act as safety glass in the event the cover glass 106 is broken.

FIG. 5 also shows an embodiment of SIM card release mechanism 1100 in accordance with the described embodiments. SIM card release mechanism 1100 can include tray 1102 (FIG. 8) suitable for securing a SIM card when placed thereon. Embedded magnets 202 may also be provided in the housing 102 at magnet slots 168 at an edge of the housing 102. The magnets 202 can be used in conjunction with a segmented cover assembly that can be used for what is referred to as a peek mode of operation of portable computing device 100. When a segment of the cover assembly is lifted from glass cover 106, sensors in portable computing device 100 can detect that the segment of the cover assembly and only that segment has been lifted from glass cover 106. Once detected, portable computing device 100 can activate only the exposed portion of the display 132. For example, portable computing device 100 can utilize a Hall Effect sensor to detect that the segment has been lifted from glass cover 106. In the illustrated embodiment, the Hall Effect sensor can be mounted on the sensor board 200. FIG. 4 shows an attachment point 166 for the Hall Effect sensor. Additional sensors, such as optical sensors, can then detect if only the segment has been lifted or if additional segments have been lifted. Such sensors are located near and coupled to the sensor board 200, which is adjacent the magnets 202.

The portable computing device 100 can include one or more button assemblies by which the user of the portable computing device 100 can activate various functions. Button assemblies can be mounted through the surface of the cover glass 106 in the portable computing device 100 or through a front, side or back portion of the single piece housing 102 of the portable computing device 100. The button assemblies can be designed to provide a desired tactile feedback to the user when activating the button assembly's function. In addition, the button assemblies can be designed, in conjunction with designs of both outer surfaces of and inner connection points within the portable computing device 100, to be positioned approximately flush with the outer surfaces in neutral, "non-depressed" state, even with internal circuit boards located at a distance from a top portion of the button assembly.

Figure 10:
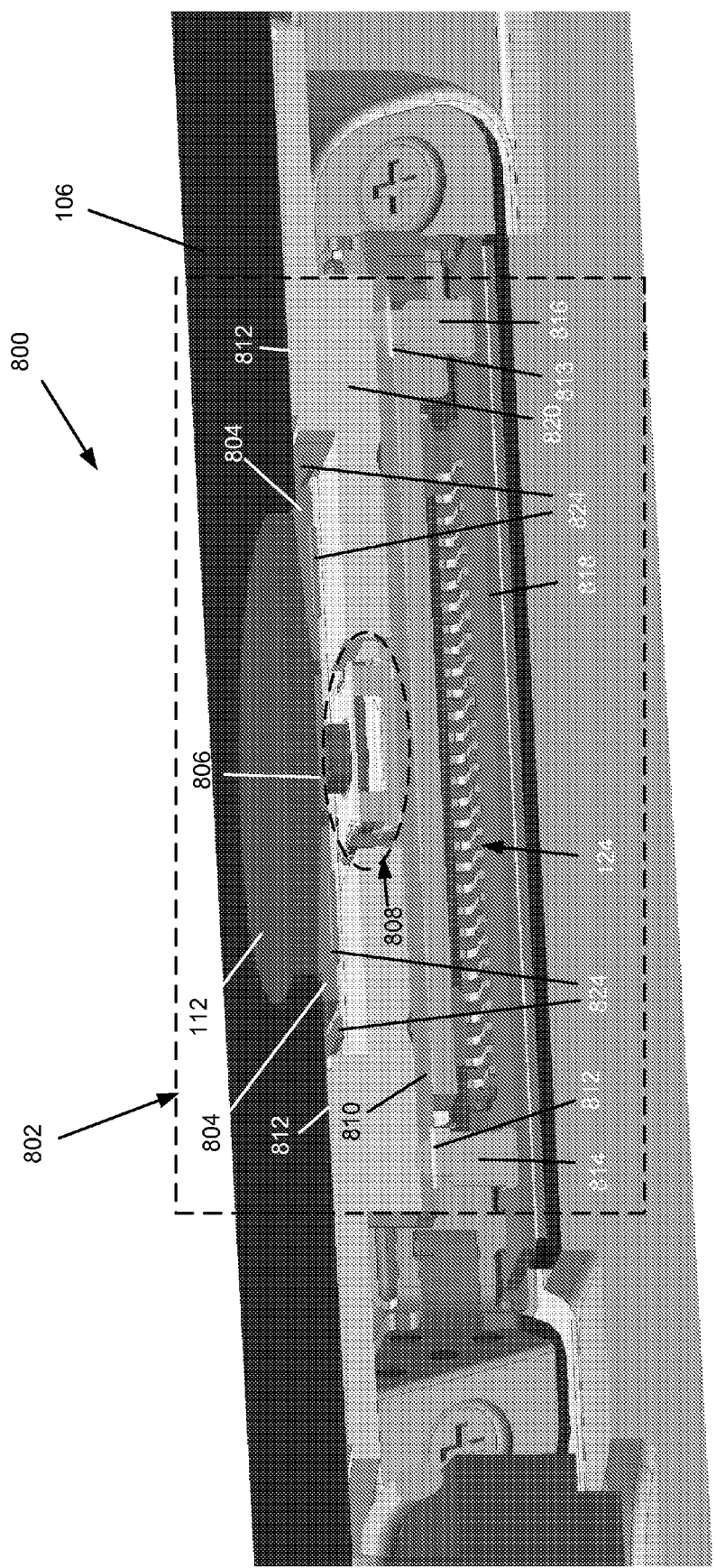
FIG. 10 illustrates a cross-sectional perspective view of a button assembly mounted through a cover glass of a portable computing device in accordance with the described embodiments.

FIG. 10 illustrates a first cross-sectional perspective view 800 of a home button assembly 802 mounted through cover glass 106 of a portable computing device 100 in accordance with the described embodiments. The home button assembly 802 can include an external flat or curved button body 112 that rests approximately flush with an exterior surface of cover glass 106. Flanges 804 can be mounted on the underside of (or integrally formed with) the external button 112 and extend beneath the underside of cover glass 106. A central post 806 can be mounted to the underside of (or be integrally formed with) the external button body 112 positioned above a tactile switch unit 808, which can be mounted to a bracket 820. The bracket 820 can be formed of a metal, such as stainless steel, and can be adhered to the cover glass 106 using an adhesive 826, such as, for example, PSA. In a neutral, "non-depressed" state, the central post 806 can be at a distance from the tactile switch unit 808. Upon depressing the external button body 112, the central post 806 can contact the tactile switch unit 808 in a manner that results in closing a contact circuit within the tactile switch unit 808. The use of the tactile switch unit 808 can allow a user of the portable computing device 100 to experience a different "feel" when pressing at different locations on the surface of the external button body 112, as the external button body 112 can pivot about the top of the tactile switch unit 808.

The internal components of the portable computing device 100 can include a flexible circuit or flex 818 through which signals can be conducted as a result of depressing the external button 802. The flex 818 can be located at a distance from contact points of the tactile switch unit 808. The distance can be such that the tactile switch unit 808 cannot be mounted directly on the flex 818, as the travel distance of the center post 806 of the external button body 112 can be too short to reach the tactile switch unit 808 when depressed to activate a function. The flex 818 can also include components in a region directly beneath the external button body 112 that preclude mounting the tactile switch unit 808 directly to the flex 818. Instead, a connection can be made between the flex 818 and the tactile switch unit 808.

As shown in FIG. 10, the tactile switch unit 808 can be mounted to an intermediate printed circuit board 810. In some implementations, the intermediate printed circuit board 810 can be connected to the flexible circuit or flex 818 through a flexible cable; however, such a connection can complicate the assembly process. In some embodiments, the flexible cable connection can preclude a simple machine automated assembly and require manual assembly by a technician. The representative embodiment shown in FIG. 10 avoids manual assembly by enabling a connection from the intermediate printed circuit board 810 to the flex 818 through a pair of conductive posts 814/816 and a pair of conductive pads 812/813. A first conductive post 814, for example, can be connected to a DC power level supplied through the flex 818, while the second conductive post 816 can be connected to a GND level in the flex 818. Conductive posts 814 and 816 can be connected to separate conductive pads 812 and 813 respectively mounted on the underside of the intermediate printed circuit board 810. A stiffener can be positioned underneath the conductive posts 814 and 816 to improve rigidity.

Depressing the external button body 112 can close a circuit within the tactile switch unit 808 connecting the first conductive post 814 to the second conductive post 816 and thereby permitting current to flow, which can activate directly or indirectly a function of the portable computing device 100. In addition to providing a conductive path, the conductive posts 814 and 816 can be sized and positioned between the intermediate printed circuit board 810 and the flex 818 to "tune" the tactile feel of the button assembly 802 for the user of the portable computing device 100. For example, the conductive posts 814 and 816 can be positioned closer together or further apart, and the thickness of the intermediate printed circuit board 810 can be varied to increase or decrease flexing that can occur when depressing the external button 802 to contact the tactile switch unit 808.

Figure 11:
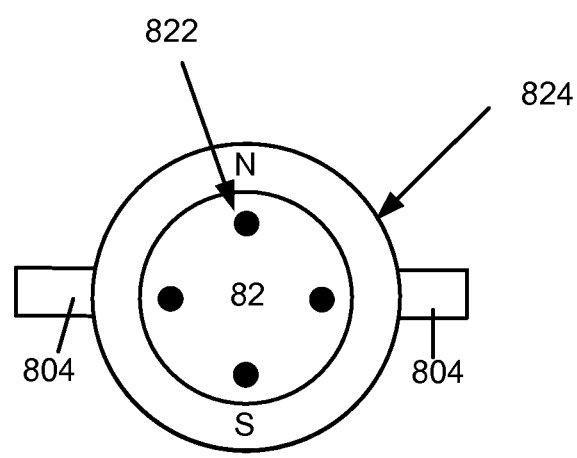
FIG. 11 illustrates a top view of a portion of the button assembly of FIG. 10.

As shown in FIG. 10, the intermediate circuit board 810 can be mounted to the tactile switch unit 808. FIG. 11 illustrates a simplified top view of the home button assembly with the flanges 804 extending a bit from underneath the external button body 112. The top of the external button body 112 can include directional markers 822 that can assist a user in locating the external button body 112 as well as guide the user into applying pressure at appropriate locations on the external button body. The directional markers 822 can take different forms including tactile raised dots and compass point (for example north (N) and south (S)) markers. During operation of the portable computing device 100, the user can apply pressure off center on the surface of the home button body 112. A flexure or anti-rotation ring 824 can be provided around the directional markers 822.

Button assemblies can also be mounted through a portion of the single piece housing 102 that encloses the portable computing device 100. As the single piece housing 102 can be relatively thin to reduce weight of the portable computing device 100, openings in the housing 102 can impact the structural integrity of portions of the housing 102 near the opening. For relatively large openings, a structural support section can be included inside the housing 102 to improve rigidity; however, a button assembly can still require access through the structural support section. It can be desirable to minimize the size of openings through the structural support section, thereby retaining a desired strength of structural support, when using a relatively larger exterior button that can use a relatively larger opening in the housing 102.

In some embodiments, portable computing device 100 can include a camera module 134 configured to provide still and video images. The placement may be widely varied and may include one or more locations, including for example front and back of the device, i.e., one through the back housing, the other through the display window. As shown in FIG. 3, there can be a rear camera window 138 through the housing 102. A front camera window 139 (FIG. 13) can also be provided for a front-facing camera through the display window. FIG. 5 shows a camera window through the display window in the front of the device 100 at the camera module 134.

Figure 12:
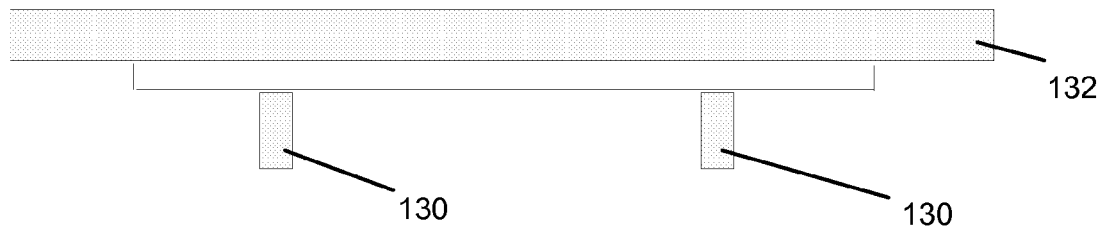
FIG. 12 is a side view of a portion of the display with alignment pins for the camera module.
Figure 13:
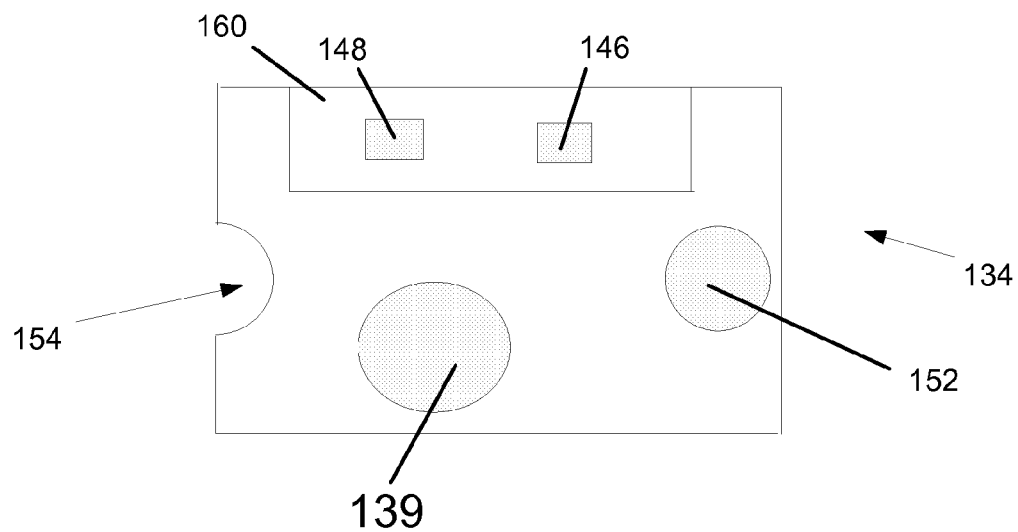
FIG. 13 is a top plan view of the camera module.
Figure 14:
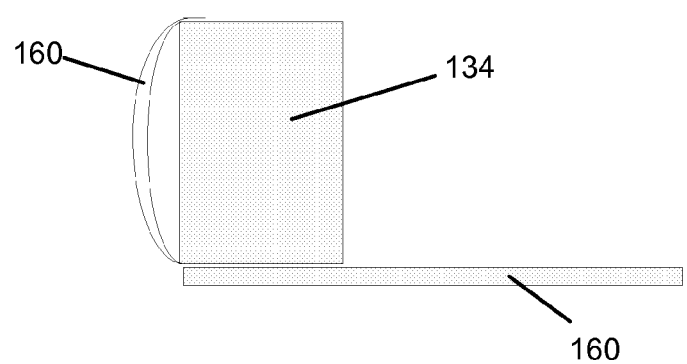
FIG. 14 is a side view of the camera module and a portion of the flex connector coupled to it.

The camera module 134 can be aligned with the display 132 by using alignment pins 130 provided on the bottom surface of the display 132, as shown in FIG. 12. These alignment pins 130 line up with a hole 152 and a slot 154 in the top surface of the camera module 134 shown in FIG. 13. The alignment pins 130 and corresponding hole 152 and slot 154 in the camera module help to align the camera 134 to the display 132 in the x and y directions. As shown in FIG. 14, a flex connector 160, which extends under the camera module 134 and wraps around the side to the top of the camera module 134, can couple the camera module 134, ALS 146, and thermal sensor 148 all to the sensor board 200, which in turn is connected to the MLB.

An ambient light sensor (ALS) 146 and a thermal sensor 148 can also be provided on the area of the camera module 134. The ALS 146 can sense when the device 100 is in a dark environment or when the device 100 is in a light environment. Ambient light can include the light surrounding the portable computing device 100 that is produced by sunlight, incandescent light, fluorescent light and the like. If the portable computing device 100 is in a dark environment, the display 132 of the portable computing device 100 can be powered down to be dimmer and to save battery power. Conversely, if the portable computing device 100 is in a light environment, the display 132 can be powered up to be brighter. For example, the display 132 can be dimmed when the ALS 146 senses that the ambient light level decreases a certain amount or reaches a predetermined or specified darkness level, and the display 132 can be brightened when the ALS 146 senses that the ambient light level increases a certain amount or reaches a predetermined or specified lightness level.

In some cases, multiple ambient light sensors may be used. This may help produce a more accurate reading of ambient light as, for example, through averaging. This may also help in determining whether the portable computing device 100 is actually in a dark environment as opposed to when light is being blocked from getting to the ALS 146 (e.g., if one sensor is blocked, another sensor is still sensing the ambient environment).

The thermal sensor 148 can provide temperature data for the device 100 to prevent thermal runaway. The thermal sensor 148 can distinguish between external heat and internal heat. For example, the thermal sensor 148 can distinguish between solar heat received by the device 100 from the sun versus heat produced by the components internal to the device 100.

The camera module 134, with the ALS 146 and thermal sensor 148, can be mounted to the housing by first pre-loading a foam support into the recess 136 before the camera module 134 is placed in the recess 136. The foam support can bias the camera module 134 against the display assembly 132, with the camera module 134 adhered to the display assembly using, for example, PSA. With the ALS 146 and thermal sensor 148 close to the cover glass 106, there is no need for a light pipe or light guide. The sensors may be placed proximate the display 132 thereby utilizing the window and cover glass 106 that typically covers and protects the display 132. In this way, the sensors are also hidden from view. A light diffuser can also be provided.

Figure 15:
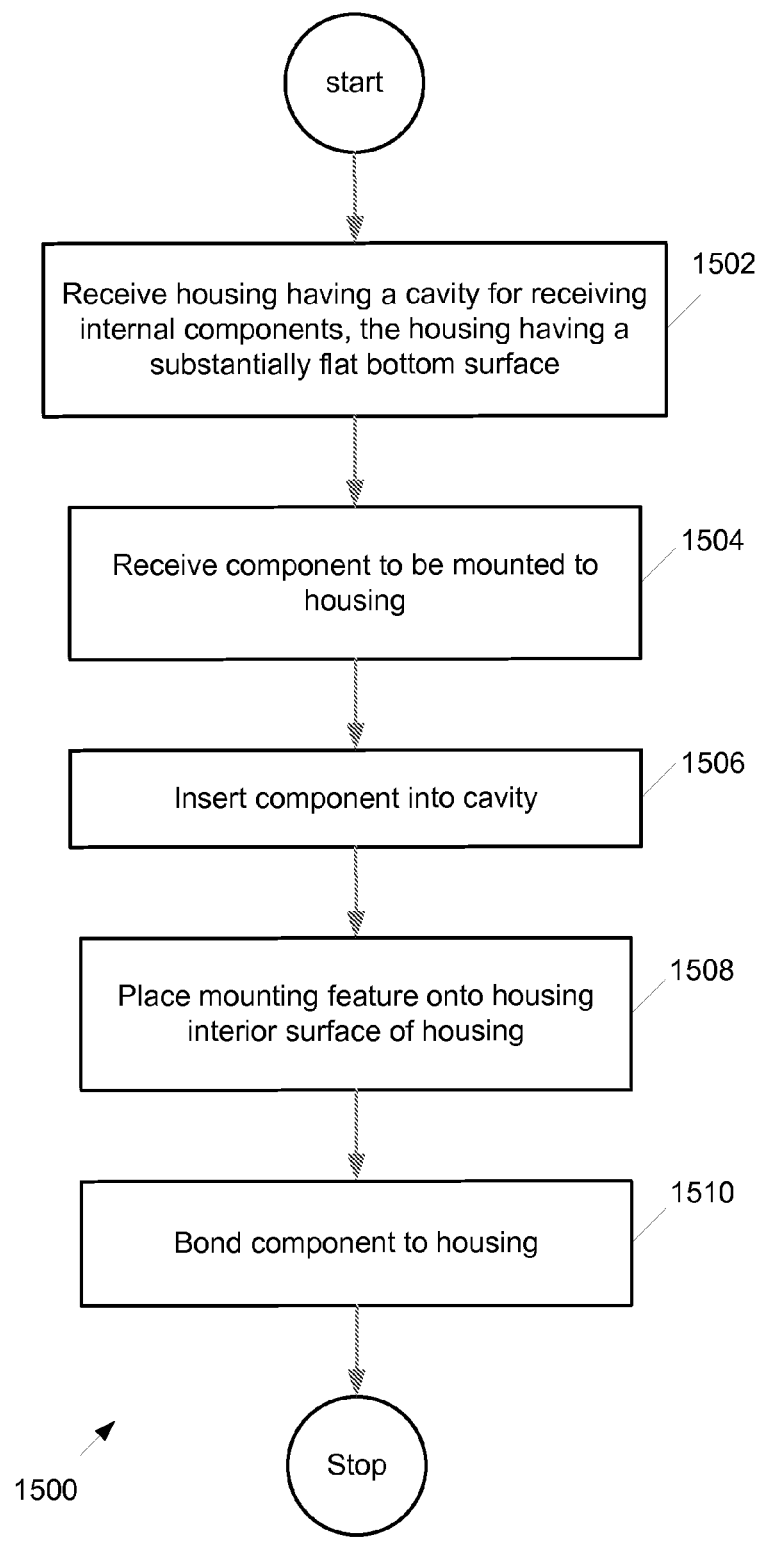
FIG. 15 shows a flowchart detailing a process in accordance with the described embodiments.

FIG. 15 illustrates a flow diagram describing process 1500 for assembling internal components for a portable computing device in accordance with the described embodiments. Process 1500 begins at 1502 by receiving housing suitable for enclosing and supporting internal components of the portable computing device. In the described embodiment, the housing can be formed to have a cavity that has a substantially flat bottom surface. The housing can also be formed to have smaller recesses along a peripheral edge portion for receiving components. The components can include, for example, a battery assembly, a main printed circuit board, a main logic board, buttons, speaker module, and so on. The housing can be formed using any well-known machining operation. Once the housing has been received at 1504, the component can be inserted into the cavity at 1506 and placed in direct contact with the interior surface of the housing at 1508. Once placed directly onto the substantially flat interior surface of the housing, the component can be attached to the housing at 1510 using any well known attaching process, such as adhering, bonding, epoxy, welding, and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the embodiments have been described in terms of several particular embodiments, there are alterations, permutations, and equivalents, which fall within the scope of these general concepts. It should also be noted that there are many alternative ways of implementing the methods and apparatuses of the present embodiments. For example, although an extrusion process is preferred method of manufacturing the integral tube, it should be noted that this is not a limitation and that other manufacturing methods can be used (e.g., injection molding). It is therefore intended that the following appended claims be interpreted as including all such alterations, permutations, and equivalents as fall within the true spirit and scope of the described embodiments.

What is claimed is:

1. A portable computing device, comprising:
   a single piece housing having a front opening, the single piece housing further comprising an integral bottom and side walls that cooperate to form a cavity in cooperation with the front opening, wherein the bottom wall has an interior surface that is substantially flat and the side walls are curved;
   a plurality of components comprising:
   at least a battery cell and a main logic board, wherein the battery cell and main logic board are mounted directly to a central portion of the interior surface of the bottom wall; and
   additional components arranged around a peripheral edge of the battery cell and main logic board, the additional components comprising a plurality of sensors, antennae, buttons, switches, and a speaker module;
   a display assembly mounted to the housing; and
   a transparent cover disposed within the front opening and attached to the housing, wherein a bottom portion of the single piece housing and the mounted display assembly form a protective enclosure for the battery cell.

2. The portable computing device as recited in claim 1, further comprising a SIM card release mechanism.

3. The portable computing device as recited in claim 1, wherein the plurality of sensors is connected to a sensor board separated from the main logic board by the battery cell, wherein the sensor board is coupled to the main logic board by a connector.

4. The portable computing device as recited in claim 1, wherein the housing is metal and the cover is glass.

5. The portable computing device as recited in claim 1, wherein the housing includes an antenna window formed of radio transparent material, wherein the antenna window replaces a corresponding portion of the housing.

6. The portable computing device as recited in claim 1, wherein the portable computing device is sized to be carried in one hand of a user and operated by the user's other hand.

7. A portable computing device, comprising:
a single piece housing having a front opening, the single piece housing further comprising an integral bottom and side walls that cooperate to form a cavity in cooperation with the front opening, wherein the bottom wall has an interior surface that is substantially flat;
a plurality of components mounted directly to the interior surface of the bottom wall, wherein the plurality of components comprises a plurality of battery cells and a main logic board in substantially a same plane, wherein the battery cells can expand into a space between battery cells during operation; and
a display assembly disposed within the front opening and mounted to the housing, wherein the housing and the display assembly together form a protective enclosure for the battery cell.

8. The portable computing device as recited in claim 7, wherein the portable computing device is sized to be carried in one hand of a user and operated by the user's other hand.

9. The portable computing device as recited in claim 7, wherein the housing is metal and the cover is glass.

10. The portable computing device as recited in claim 9, further including an antenna window formed of radio transparent material, wherein the antenna window replaces a corresponding portion of the metal housing.

11. The portable computing device as recited in claim 7, further comprising:
a transparent cover over the display assembly.

12. The portable computing device as recited in claim 7, further comprising a sensor board coupled to a plurality of sensors, wherein the sensor board is separated from the main logic board by a battery cell.

13. A portable computing device, comprising:
a single piece housing having a front opening, the single piece housing further comprising an integral bottom and side walls that cooperate to form a cavity in cooperation with the front opening, wherein the bottom wall has an interior surface that is substantially flat surrounded by a plurality of recesses in a peripheral edge portion;
a plurality of components, wherein at least one of the components is mounted directly to the substantially flat interior surface of the bottom wall and at least one of the components is mounted in a recess in the peripheral edge portion; and
a display system and transparent cover disposed within the front opening and attached to the housing.

14. The portable computing device as recited in claim 13, wherein the component mounted directly to the substantially flat interior surface of the bottom wall is a battery cell and the component mounted in the recess is an antenna.

15. The portable computing device as recited in claim 14, further comprising foam between the antenna and the housing.

16. The portable computing device as recited in claim 15, wherein the single piece housing further comprises a plurality of features for aligning a component on the substantially flat interior surface of the bottom wall.

17. The portable computing device as recited in claim 16, wherein the plurality of features align a main logic board on the substantially flat interior surface of the bottom wall.

18. The portable computing device as recited in claim 13, wherein a battery assembly and a main logic board are mounted directly to the substantially flat interior surface of the bottom wall and a plurality of antennae and sensors are mounted around the peripheral edge portion of the housing.

19. The portable computing device as recited in claim 18, wherein the plurality of sensors are connected to a sensor board that is separated from the main logic board by another component, wherein the sensor board is coupled to a the main logic board by a connector.

20. The portable computing device as recited in claim 19, wherein the connector is positioned in a space between two battery cells.

21. A method, comprising:
receiving a housing having a cavity for receiving internal components, the housing having a cavity with a substantially flat interior bottom surface;
receiving a plurality of component to be mounted to the substantially flat interior bottom surface, wherein the plurality of components includes a battery cell and a main logic board; and
bonding the components directly to the interior bottom surface of the housing, wherein the battery cell and the main logic board are in substantially a same plane.

22. The method as recited in claim 21, further comprising:
placing a cover within the front opening; and
attaching the cover to the housing without a bezel.

23. The method as recited in claim 22, further comprising:
aligning a display assembly within the front opening using a temporary alignment fixture;
securing the display assembly to the housing;
and removing the temporary alignment fixture before placing the cover within the front opening.

24. The method as recited in claim 21, wherein the portable computing device is sized to be carried in one hand of a user and operated by the user's other hand.

25. The method as recited in claim 21 wherein the housing is metal and the cover is glass.

26. The portable computing device as recited in claim 25 further comprising:
placing a display unit having a display screen within the front opening such that the display screen is visible through the glass cover.

\* \* \* \* \*